Patented Nov. 18, 1930

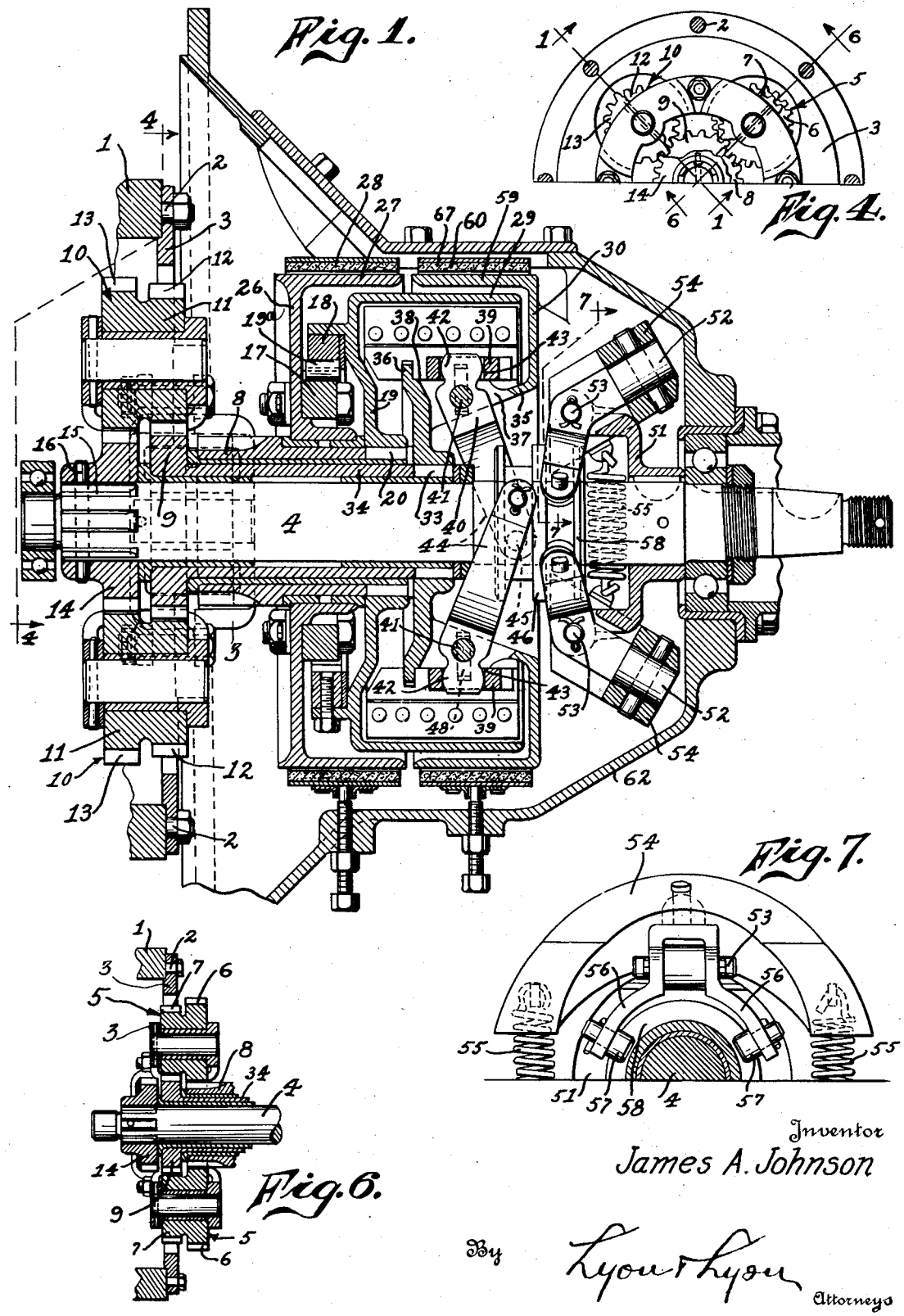

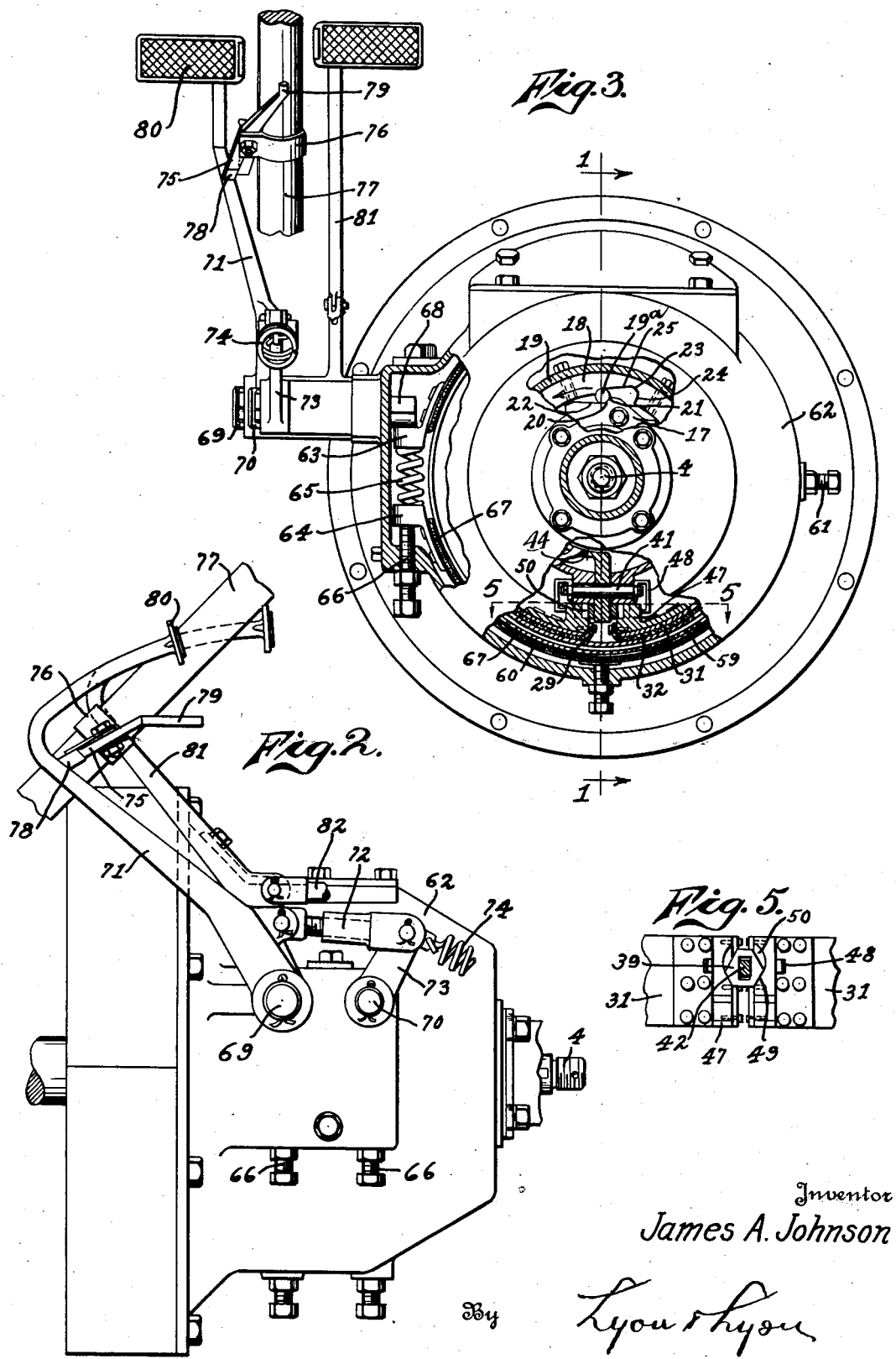

1,781,925

UNITED STATES PATENT OFFICE

JAMES A. JOHNSON, OF LOS ANGELES, CALIFORNIA, ASSIGNOR TO ANNIE W. STIMSON, OF LOS ANGELES, CALIFORNIA

TRANSMISSION MECHANISM

Application filed August 27, 1928. Serial No. 302,182.

This invention relates to a transmission mechanism and while a mechanism embodying the invention could be used for any purpose whatever, the embodiment of the invention described in the following specification adapts the invention particularly for use as a transmission for automobiles.

In driving automobiles of the gear-shift type, in starting a car it is usually started in low gear and after the car acquires a small amount of momentum, parts of the transmission are moved so as to bring into action a new driving train of gears to drive the automobile at a higher speed. Sometimes this speed is an intermediate speed and necessitates another controlling movement by the driver of the car to bring into play a third transmission gear train to drive the car at the highest speed. Such a mode of operation as this requires considerable care on the part of the operator and often causes considerable noise and if not done properly, sometimes occasioning the breaking off of gear teeth.

In a certain type of planetary transmission in use on automobiles, a foot pedal controls the low and also the high speed, in its forward position operating to hold a drum of the mechanism stationary to effect driving through the low speed gear train and in its rear position, in which it is held by a spring, operating to drive the car through the high speed gear train.

Although most types of automobiles now employ gear-shift transmissions, there are undoubtedly many features incident to planetary transmissions to recommend them. One of the objections to the type of planetary transmission referred to above is that there is a tendency on the part of drivers to release the pedal from the forward low driving position and permit it to be swung suddenly by means of its spring to its rear high speed driving position, thereby producing a sudden acceleration of the car and shocking the transmission mechanism.

The general object of this invention is to provide a transmission mechanism which in practice operates so that when the transmission is begun it is in low speed, and after the car has been accelerated to a predetermined speed, the transmission mechanism will be automatically affected to effect a driving at a higher speed.

A further object of the invention is to provide a planetary transmission mechanism in which, through the control of different parts of the mechanism, the transmission can be made to perform the functions of a clutch as well as a transmission and operate first to drive the car at a low speed and automatically control the transmission mechanism to discontinue the driving at a low speed and drive the car at a higher speed.

A further object of the invention is to provide a planetary transmission having a special construction enabling it to drive a car initially at a low speed and operating automatically at a predetermined speed of the driven shaft, through the operation of centrifugal force, to control the planetary driving mechanism so as to drive the driven shaft from the driving member through the planetary cage at a one to one ratio.

In the preferred construction of a transmission mechanism embodying this invention, the mechanism includes a member which may be called a reaction ring and which is mounted so that it can be held fixed at will. In driving at low speed the necessary reaction for driving through the planetary mechanism is provided by this reaction ring through the medium of a clutch ring that has an interlocking connection with the reaction ring for this purpose.

One of the objects of the invention is attained by the employment of this reaction ring and by constructing the parts in such a way that when the high speed driving is being effected, the clutch ring will move with the mechanism in the direction of rotation which will be permitted by the reaction ring.

A further object of the invention is to provide a transmission mechanism of this type operating as suggested and capable of driving the driven shaft in reverse at a low speed.

Another object of the invention is to provide a transmission mechanism which will operate in such a way that when the car is ascending a relatively steep hill which is impossible to ascend in high speed, the transmission will automatically change over from the high speed driving train to a low speed driving train.

Further objects of the invention will appear hereinafter.

The invention consists in the novel parts and combination of parts to be described hereinafter, all of which contribute to produce an efficient transmission mechanism.

A preferred embodiment of the invention is described in the following specification, while the broad scope of the invention is pointed out in the appended claims.

In the drawing:

Figure 1 is a longitudinal vertical section through a transmission mechanism embodying my invention, certain parts being broken away. This view is a section taken generally on the line 1—1 of Figure 3. In this figure the section through the planetary gearing is taken on the line 1—1 of Figure 4.

Figure 2 is a side elevation of the transmission mechanism, certain parts being broken away.

Figure 3 is an elevation showing the transmission mechanism as viewed from the right end of Figure 1, with certain parts broken away or shown in section so as to disclose details of the construction on the interior of the casing.

Figure 4 is an elevation taken about in the plane of the line 4—4 of Figure 1, but showing only the upper half of the planetary gearing.

Figure 5 is a detail section taken about on the line 5—5 of Figure 3 and illustrating details of the mounting for a clutch band which constitutes a feature of the invention.

Figure 6 is a section through the planetary gears taken on the line 6—6 of Figure 4, but showing the entire planetary gears instead of only a half of the gears, as in Figure 4.

Figure 7 is a section taken on the line 7—7 of Figure 1 and particularly illustrating the details of the centrifugal speed-control device which constitutes a feature of the invention.

Before proceeding to a more specific description of the transmission described herein, it will facilitate the disclosure to state that in the operation of the mechanism it performs the functions of a clutch as well as the functions of a transmission when the invention is embodied in a planetary type of transmission. In the operation of the transmission, as soon as the clutch has been closed, the driven shaft will be driven through the reduction gearing and at a reduced speed ratio with respect to the driving member or driving shaft. When the speed of the car has increased to a point which would enable the car to be driven at high speed by the engine, automatic mechanism comes into play to "cut out" the reduction driving train, or inhibit its operation, and effect a connection or relation between the driving member and the driven shaft that will drive the driven shaft at a higher speed, preferably at the same speed as the driving member. These conditions of performance are most readily achieved by means of a planetary transmission.

In order to accomplish these effects, I provide reduction gearing between the driving member and the driven shaft for driving the driven shaft at a reduced speed ratio, and I also provide a speed-controlled device with means controlled by it for affecting the reduction gearing in such a way as to enable it to drive the driven shaft at a high speed.

In practice, in a planetary transmission embodying the invention, the speed-controlled device effects a locking of certain gears of the reduction gearing so that the driving members becomes virtually coupled to the driven shaft so as to drive it at the same speed as the driving member; in other words, with a one to one driving ratio. Furthermore, the mechanism is so constructed that by applying a holding band in such a way as to hold a sun-gear of the transmission against rotation, the effect of a clutch is obtained, operable at will, and operating so that when the band is loose no reaction member is provided for enabling the transmission to drive the driven shaft. By employing a second sun-gear of a different diameter from the first sun-gear and meshing with rigid pinions of different diameters on the planetary cage, it is possible to effect a direct drive through the planetary cage by locking the two sun-gears against relative rotation. My mechanism includes means for effecting this, which means is controlled by the speed attained by the driven shaft.

Referring more particularly to the drawings, 1 represents a driving member which is indicated as the rim of a fly-wheel of an engine, broken away. This driving member is connected rigidly by means of studs 2 to a planetary cage 3. This planetary cage preferably carries two sets of driving pinions.

The planetary cage carries reduction gearing through which the driven shaft 4 may be driven at a reduced speed ratio. The planetary reduction gearing preferably includes two sets of pinions indicated generally by the numeral 5, (see Figure 6) and including two duplex pinions, each duplex pinion having a common hub and having a pinion 6 of relatively large diameter and a pinion 7 of relatively small diameter. These pinions mesh respectively with two sun-gears 8 and 9 (see Figure 6) that are capable of free rotation on the driven shaft 4. In the operation of the transmission, the sun-gear 8 may be held fixed at will, whereupon the planetary rotation of the pinions 6 and 7 will cause a rotation of the sun-gear 9 on the axis of the shaft.

The planetary reduction gearing also includes another set of pinions, indicated generally by the numeral 10, and including two duplex pinions 11, each duplex pinion having a common hub with a pinion 12 of relatively small diameter that meshes with the sun-gear 9, and a pinion 13 of slightly larger diameter that meshes with a driven gear wheel 14 that is rigidly secured to the driven shaft 4, preferably by a spline connection 15 and a through pin 16.

The mechanism includes means operable at will for holding the sun-gear 8 fixed. However, I prefer not to do this directly but, rather, indirectly and through the medium of a one-way clutch connection which will enable the sun-gear 8 to be held against rotation in one direction only, so that it will provide reaction for driving the pinions when the planetary cage rotates. By accomplishing this effect in this way, the continued application of the holding band does not interfere with the rotation of the sun-gear 8 when the high speed driving train is in operation. In order to accomplish this I provide a part which I call a reaction ring, 17, and this part has a one-way connection with a clutch ring 18. This clutch ring is attached to the rim of a drum wheel 19 that is connected by a spline connection 20 with the sun-gear 8. This mechanism is illustrated most clearly in Figures 1 and 3. The one-way connection includes movable members which may engage the rings 17 and 18 to lock them against rotation in one direction, but these members are so mounted that under the action of centrifugal force when the high speed drive takes place they will disengage themselves from the inner ring, that is to say, the reaction ring, 17.

For this purpose I provide a plurality of small rollers 19ª, mounted between the adjacent edges of the rings 17 and 18 (see Figure 3). When the low speed drive is taking place, the ring 17 will be held fixed by means to be described hereinafter, and the rollers 19 will be lodged in pockets 20 with abrupt faces 21 at one side and inclined faces 22 at the other side, these pockets 20 being formed in the edge of the ring 17. Similar pockets 23 are formed in the clutch ring 18, having abrupt faces 24 and inclined faces 25. With this organization of parts, by referring to Figure 3 it will be evident that the ring 17 when held against rotation will prevent a clockwise rotation of the ring 18, but could permit a rotation of the ring 18 in an anti-clockwise direction. The mode of operation of these rollers 19 in this connection will be described more in detail in describing the mode of operation of this clutch connection. It should be stated, however, at this time, that although these parts are referred to as constituting a clutch connection, it should be understood that this is not a driving clutch through which any transmission occurs; it is more accurate to call it a reaction clutch to merely provide reaction for the driving train in driving the driven shaft at reduced speed and to permit free relative rotation of the clutched parts when the high speed drive occurs.

In order to provide means for holding the reaction ring 17 fixed at will, I attach it to a wheel 26 having a drum rim 27 with which a hand 28 co-operates. This band may have the general features of construction of an ordinary transmission band of a planetary transmission gearing, and these details will be described hereinafter. I shall now describe the automatic mechanism that comes into play after the car has been started by applying the band 28 to the drum rim 27. This mechanism is so constructed that it will operate after the car has acquired sufficient momentum to enable it to be driven "in high," that is to say, through the high speed driving train. This effect is preferably accomplished by providing means for locking the two sun-gears 8 and 9 against relative rotation. By doing this, the pinions 5 will stop rotating, because it is evident that, being of duplex type with a common hub, they cannot be rotated at different speeds by the sun-gears 8 and 9. In other words, when the sun-gears 8 and 9 are locked together, a torsional force is set up in the hubs of the pinions 5, they become locked against rotation, and then the two sun-gears, 8 and 9, rotate at the same speed, being driven by the rotating cage 3. This virtual fixing of the gears 8 and 9 on the axis of the driven shaft 4 of course prevents further rotation of the pinions 10, and they rotate fixedly as though a part of the cage 3. In this way the pinion 13 drives the gear wheel 14 as though rigid with it. In this way one to one transmission is effected from the driving member 1 to the shaft 4.

In order to effect the locking of the two sun-gears 8 and 9 to cause this one-to-one drive to come into effect, I provide the wheel 19 with a drum rim 29 and I also provide a wheel 30 to carry means for co-operating with the wheel 19 to lock the sun-gears together. This locking means is preferably of friction type, for which reason I employ the drum rim 29. The wheel 30 operates as a carrier for friction members such as the bands 31, constructed like brake bands, and carrying facings or liners 32 to contact with the inner face of the drum rim 29. To this end the hub of the wheel 30 is connected by a spline connection 33 with a tubular extension 34 from the hub of the sun-gear 9. The body 35 of this wheel or carrier 30 has a disc portion 36 at one side that supports the ends of the bands 31, and at two diametrically opposite points the body 35 of the wheel 30 is formed with radial slots 37. The outer edges of each of these slots 37 forms a guide face 38 for a spreader or wedge block 39, the position of which is controlled by centrifugal means. The construction is such that when these wedge blocks are moved longitudinally with respect to the axis of the driven shaft 4, the bands 31 will be expanded so as to lock the wheel 30 frictionally to the drum rim 29. Means is provided mounted in the slots 37 for effecting this movement of the wedge blocks 39. (See Figure 5.) For this purpose in each slot 37 a lever 40 is mounted on a cross-pin 41 in the slot. The outer end of this lever is formed into a rounded head 42 that fits into a longitudinal slot 43 formed in the block. (See Figures 1 and 5.) The inner end of each lever is formed into an arcuate yoke 44 that extends inwardly and around the side of the shaft 4 and carries a pin or roller 45 to co-operate with a sliding collar 46 mounted on the shaft 4. A centrifugal control device is provided to slip this collar 46 toward the right as viewed in Fig. 1 when the speed of the shaft 4 arrives at a predetermined R. P. M.

As illustrated in Figure 3, the ends of the bands 31 are formed with inwardly projecting lugs 47, and these lugs are forced toward each other by springs 48 attached to the ends of the bolts or pins 41. These springs 48 operate to hold the bands 31 out of contact with the drum rim 29 when this friction clutch is open. In other words, I provide a friction clutch construction between the wheel 19 (rigid with sun-gear 8) and the wheel 30, which is rigid with the sun-gear 9.

Referring again to the construction of the wedge blocks 39, attention is called to Figure 5, showing the sides of these blocks with inclined faces 49 which engage with corresponding inclined side faces formed in the lugs 47. In other words, a pocket 50 is formed on the inner face of the lug so that these wedge blocks are retained in this pocket. (See Figures 3 and 5.)

The centrifugal device which I employ has substantially the construction of a centrifugal governor. In the present instance I have arranged this governor so that it is carried on the driven shaft 4. In practice, however, in order to utilize its functions it is merely necessary that it be driven through the reduction gearing. In the present instance I employ a hub 51 rigidly attached to the driven shaft 4, and carrying two centrifugal levers 52. These levers are attached on diametrically opposite pins 53, and each lever carries a centrifugal weight 54. These weights are of horseshoe form (see Fig. 7) and their ends are connected by coil springs 55 so that as the weights fly out under the action of centrifugal force, the levers 52 would be actuated.

The inner end of each lever is formed into a yoke with two forks 56 (see Fig. 7) that extend around the sides of the shaft 4 and carry rollers 57 that engage with a collar 58 rigid with the collar 46. In the present instance this collar 58 is formed integral with the collar 46. With this construction, it will be evident that when the weights 52 fly out sufficiently, the collars 58 and 46 will be moved to the right, thereby causing the wedge blocks 39 to expand the bands 31 and thereby lock the wheel 30 to the drum rim 29. This, of course, frictionally locks the two sun-gears 8 and 9 to each other. After this occurs, the driving train through the transmission mechanism will be from the fly-wheel 1 through the cage 3 and the lock pinions 5 and 10 so that the two sun-gears 8 and 9 and the gear wheel 14 will all rotate in unison with the driven shaft 4.

The driven shaft 4 may be driven in a reverse direction by holding the wheel 30 and at the same time releasing the holding band 28 from the drum rim 27. To this end I provide the wheel 30 with a drum rim 59 (see Fig. 1) with which co-operates a holding band 60. The holding bands 28 and 60 are similarly constructed, as it is most convenient to have the diameters of the drum rims 27 and 59 equal to each other. The mounting of these drum rims is illustrated in Fig. 3. They are supported on an adjustable anchor-bolt 61 mounted in the casing 62 at the right, as viewed in Fig. 3.

The free ends of the bands are provided with lugs such as the lugs 63 and 64, forced apart by a spring 65 to hold the bands off when not in operation. The lower lug 64 may be mounted on an adjusting screw 66, which may be adjusted into take up wear on the band liner 67. The upper lug 63 is engaged on its upper side by a cam 68. These cams are carried on two shafts 69 and 70, (see Fig. 2) the shaft 69 corresponding to the band 28 and the shaft 70 corresponding to the band 60. By rocking the shaft 70 in an anti-clockwise direction the band 60 will be tightened on the drum rim 59. A rocking of the rock shaft 69 in this same direction, however, will release the band 28. In other words, the cams 68 are oppositely disposed so that if these shafts 69 rock in a clockwise direction, the band 28 would be tightened and the band 60 loosened. In order to enable the bands to be controlled simultaneously, I provide the rock shaft 69 with a rigid pedal 71 (see Fig. 2) and I connect this pedal by an adjustable link 72 with an arm 73 rigidly attached to the rock shaft 70. I also provide a coil spring 74 attached to the arm 73 at one end and anchored at any suitable point to a lug rigid with the casing of the transmission. In other words, the right end of the spring 74 is attached to a fixed point.

In order to hold the pedal 71 in neutral, I provide a foot-controlled dog 75 (see Fig. 3) pivotally attached to a collar 76 on the steering post 77. As illustrated in Fig. 3, the lower end or head 78 of this dog is holding the pedal 71 down. By pushing the tail 79 of this dog toward the left with one's toe, this dog or latch can be released. In doing this, the left foot should be held on the foot plate 80 of the pedal, so as to enable the pedal 71 to be gradually pulled up or toward the right by the spring 74. As the pedal 71 arrives at the end of this movement by the spring 74, the band 28 will tighten on the drum rim 27 and the transmission will be placed "in low." The reverse band 60 at this time will, of course, be held in its "off" position.

In Fig. 2 I illustrate an ordinary brake pedal 81 which may be connected by a link 82 with the brakes of the automobile. This brake means, however, constitutes no part of my invention.

The mode of operation of the entire mechanism will now be briefly described.

As illustrated in Figures 1 and 3, the bands 28 and 60 are both held off their corresponding drum rims 27 and 59. In this position the engine will run free of the transmission. In other words, the fly-wheel 1 can rotate without driving the driven shaft 4. In starting up the engine, the operator releases the pedal 71 from the latch or dog 75 and permits the spring 74 to rotate the pedal 71 slightly upward or in a clockwise direction, as viewed in Figure 2. This will apply the band 28 to the drum rim 27 and hold the reversing band 60 off of the reversing drum rim 59. Holding the drum rim 27 will hold the reaction ring 17 fixed and this ring operating through the rollers 19 (see Figure 3) will lock the clutch ring 18 against rotation in a clockwise direction. (See Figure 3.) In other words, through the connection of this ring 18 with the sun-gear 8, the sun-gear 8 will operate to provide reaction for driving the driven shaft 4 at reduced speed in a forward direction.

Referring to Figures 1 and 6, it will be evident that as the cage 3 rotates with the fly-wheel, the pinions 6 and 7 will have a planetary movement around the stationary sun-gear 8. This will transmit rotation to the sun-gear 9 which will drive the pinions 10 and through them drive the gear wheel 14 on the end of the driven shaft 4. This will start the car in low, and after the car has acquired sufficient momentum, the centrifugal weights 54 will swing to the left as viewed in Figure 1, on their pivots 53, thereby moving the collar 46 to actuate the wedge blocks 39, which will move toward the left and expand the bands 31. (See Figure 3.) Expanding these bands will press them against the inner face of the drum rim 29 and, after slipping for a time during which the car is driven at a gradually increasing speed, the bands will become locked to the drum rim 29. This will lock the two sun-gears 8 and 9 together, after which rotation of the pinions 5 and 10 on their axes cannot take place, and the fly-wheel 1 will then rotate the driven shaft 4 at its own speed. In addition to this function of automatically putting the engine "in high" the friction clutch which is formed between the wheel 19 and the wheel 30 operates automatically to open in ascending a hill where it is impossible for the engine to continue in high, for example, where the grade is too steep. Under such circumstances this friction clutch will open automatically and the transmission mechanism will disconnect the direct driving train through the cage and the transmission mechanism will automatically go back into "low" drive.

In connection with the clutch connection between the ring 17 and the ring 18, it should be understood that when the transmission goes into "high" the ring 18 will be driven in the direction of the arrow in Figure 3, which is the direction which is permitted by the ring 17. When the transmission goes into "high" the rollers 19ª fly out by centrifugal force into the pockets 23 of the ring 18, where they are held out of engagement with the ring 17. This enables them to operate without making any noise. Of course, if desired, an ordinary one-way ratchet and pawl construction could be used for this clutch connection, but such a connection would be objectionable on account of the noise that would be caused by the ratchet teeth striking the pawl. Such a noise would be a necessary incident to such a ratchet and pawl construction unless the pawls were disconnected automatically by centrifugal force. I prefer, however, to employ a one-way clutch construction, constructed as described, instead of an ordinary ratchet and pawl connection.

If it is desired to reverse the engine, it is merely necessary to press the pedal 71 down to the limit of its downward movement. This will give the rock shaft 69 anti-clockwise rotation, which will release the band 28 from its drum rim 27 and apply the band 60 to its drum rim 59. Holding the drum rim 59 will operate to hold the sun-gear 9 fixed, and this will operate through the planetary drive to drive the driven shaft 4 in a reverse direction.

It is understood that the embodiment of the invention described herein is only one of the many embodiments this invention may take, and I do not wish to be limited in the practice of the invention, nor in the claims, to the particular embodiment set forth.

What I claim is:

1. In a transmission mechanism, the combination of a driving-member, a driven-shaft, a planetary reduction-gearing between the driving-member and the driven-shaft for driving the driven-shaft at a reduced speed-ratio, hand operated means capable of assuming a starting position to cause the planetary reduction gearing to drive the driven shaft at the reduced speed ratio in commencing the transmission of movement through the transmission mechanism, and automatic means controlled by the speed of the driven shaft operating while the said hand-operated means is maintained in said starting position, for ceasing the driving at the reduced speed ratio and effecting the driving of the driven shaft at a higher speed.

2. In a transmission mechanism, the combination of a driving member, a driven shaft, a planetary reduction gearing between the driving member and the driven shaft for driving the driven shaft at a reduced speed ratio, hand-operated means operable at will for holding a part of the planetary reduction gearing to effect the driving of the driven shaft at the reduced speed ratio in commencing the transmission of movement through the transmission mechanism, and automatic means controlled by the speed of the driven shaft operating while the said held part is maintained stationary, to cease the driving at the reduced speed ratio and effect the driving of the driven shaft at a higher speed.

3. In a transmission mechanism, the combination of a driving-member, a driven-shaft, a planetary reduction-gearing including a planetary cage rotating on the axis of the driven-shaft, and planetary pinions mounted on the cage, a sun-gear having a driving connection with the planetary driving pinions and capable of rotating freely on the axis of the driven-shaft, means operable at will for holding the sun-gear fixed to effect the driving of the driven-shaft at a reduced speed from the driving-member, a speed-controlled device, and means controlled by the speed-controlled device for holding wheels of the planetary reduction-gearing against rotation on their own axes, to drive the driven-shaft at the same speed as the driving-member.

4. In a transmission mechanism, the combination of a driving-member, a driven-shaft, a planetary reduction-gearing including a planetary cage rotating on the axis of the driven-shaft, and pinions mounted on the cage, a pair of sun-gears capable of free rotation on the axis of the driven-shaft and having a driving connection with the planetary pinions, means operable at will for holding one of said sun-gears against rotation to drive the driven-shaft through the planetary pinions at a reduced speed-ratio, a speed-controlled device, and means controlled by the speed-controlled device for locking the two sun-gears against relative rotation and thereby drive the driven-shaft at the same speed as the driving-member.

5. In a transmission mechanism, the combination of a driving-member, a driven shaft, a planetary reduction-gearing including a planetary cage rotating on the axis of the driven shaft, and pinions mounted on the cage, a pair of sun-gears capable of free rotation on the axis of the driven shaft and having a driving connection with the planetary pinions, means for holding one of said sun-gears against rotation in one direction to provide reaction to enable the driving-member to drive the driven-shaft through the planetary pinions at a reduced speed-ratio, a speed-controlled device, and means controlled by the speed-controlled device for locking the two sun-gears against relative rotation and thereby drive the driven-shaft through the planetary cage at the same speed as the driving-member.

6. In a transmission mechanism, the combination of a driving-member, a driven-shaft, a planetary reduction-gearing including a planetary cage rotating on the axis of the driven shaft, and pinions mounted on the cage, a pair of sun-gears capable of free rotation on the axis of the driven shaft and having a driving connection with the planetary pinions, a reaction ring coaxial with the driven shaft, means operable at will for holding the same fixed, a one way connection between one of said sun-gears and said reaction ring to provide reaction for the last-mentioned sun-gear to enable the driving-member to drive the driven-shaft through the planetary pinions at a reduced speed-ratio, a speed-controlled device, and means controlled by the same for locking the two sun-gears against relative rotation, and thereby effect the driving of the driven shaft through the planetary cage and pinions at the same speed as the driving-member.

7. In a transmission mechanism, the combination of a driving-member, a driven-shaft, a planetary reduction-gearing including a planetary cage rotating on the axis of the driven-shaft, and pinions mounted on the cage, a pair of sun-gears capable of free rotation on the axis of the driven-shaft and having a driving connection with the planetary pinions, a reaction-ring coaxial with the driven-shaft and capable of free rotation relative to the shaft, hand-operated means for holding the reaction ring fixed at will, a one-way clutch connection between one of the said sun-gears and said reaction ring to provide reaction for the same to enable the driving-member to drive the driven-shaft through the planetary pinions at a reduced speed-ratio, and a speed-controlled device for locking the two sun-gears against relative rotation and thereby effect the driving of the driven shaft through the planetary cage and pinions at the same speed as the driving-member.

8. In a transmission mechanism, the combination of a driving-member, a driven-shaft, a planetary reduction-gearing including a planetary cage rotating on the axis of the driven-shaft, and pinions mounted on the cage, a pair of sun-gears capable of free rotation on the axis of the driven-shaft and having a driving connection with the planetary pinions, a reaction-ring coaxial with the driven-shaft and capable of free rotation relative to the shaft, hand-operated means for holding the reaction ring fixed at will, a one-way clutch connection between one of the said sun-gears and said reaction ring to provide reaction for the same to enable the driving-member to drive the driven-shaft through the planetary pinions at a reduced speed-ratio, and a speed-controlled device for locking the two sun-gears against relative rotation and thereby effect the driving of the driven shaft through the planetary cage and pinions at the same speed as the driving-member, the said one-way clutch connection including movable members engaging the reaction ring, and operating when the driven-shaft is driven at the high speed, to move outwardly by centrifugal action, and disengage themselves from the reaction-ring.

9. In a transmission mechanism, the combination of a driving-member, a driven-shaft, a planetary reduction-gearing including a planetary cage rotating on the axis of the driven-shaft, and pinions mounted on the cage, a pair of sun-gears capable of free rotation on the axis of the driven-shaft and having a driving connection with the planetary pinions, a relatively fixed reaction-ring coaxial with the driven-shaft, a clutch-ring adjacent the reaction-ring, said clutch-ring and said reaction-ring having pockets on their adjacent faces with movable interlocking members cooperating with said pockets to permit relative rotation of the clutch-ring in one direction with respect to the reaction ring, and operating to prevent relative rotation of the clutch-ring in the other direction and thereby provide reaction to enable the driving member to drive the driven-shaft through the planetary pinions at a reduced speed-ratio, and automatic means controlled by the speed for locking the two sun-gears against relative rotation and thereby effect the driving of the driven-shaft through the planetary cage and pinions at the same speed as the driving-member.

10. In a transmission mechanism, the combination of a driving-member, a driven-shaft, a planetary reduction-gearing including a planetary cage rotating on the axis of the driven shaft, and pinions mounted on the cage, a pair of sun-gears capable of free rotation on the axis of the driven-shaft and having a driving connection with the planetary pinions, a reaction-ring coaxial with the driven-shaft having a drum-rim, a hand-controlled band for holding the drum-rim fixed at will, a one-way clutch connection between one of said sun-gears and said reaction-ring providing reaction for the last-named sun-gear to enable the driving-member to drive the driven-shaft through the planetary pinions at a reduced speed-ratio, the other of said sun-gears having a drum-rim rigid therewith, a speed-controlled device driven when the driven-shaft rotates, and means controlled by the same for engaging the second named drum-rim to lock the two sun-gears against relative rotation and thereby effect the driving of the driven-shaft through the planetary cage and pinions at the same speed as the driving-member.

11. In a transmission mechanism, the combination of a driving-member, a driven-shaft, a planetary reduction-gearing between the driving-member and the driven-shaft for driving the driven-shaft at a reduced speed-ratio, a speed-controlled device, means controlled by the speed-controlled device for locking two gears of the said reduction gearing to prevent their relative rotation and thereby effect the driving of the driven-shaft at the same speed as the driving-member, hand-controlled means for holding a part of the reduction gearing, said reduction gearing including means controlled by the hand controlled means for driving the driven shaft in reverse.

12. In a transmission mechanism, the combination of a driving-member, a driven-shaft, a planetary reduction-gearing including a planetary cage rotating on the axis of the driven shaft, and pinions mounted on the cage, a pair of sun-gears capable of free rotation on the axis of the driven-shaft and having a driving connection with the planetary pinions, hand-actuated means operable at will for holding one of the said sun-gears against rotation to drive the driven-shaft through the planetary pinions at a reduced speed-ratio, hand-operated means operable at will to hold the other sun-gear to drive the driven-shaft in reverse, a speed-controlled governor, and means controlled by the governor for locking the two sun-gears against relative rotation and thereby drive the driven-shaft through the planetary cage and pinions at the same speed as the driving-member.

13. In a transmission mechanism, the combination of a driving-member, a driven-shaft, a planetary reduction-gearing including a planetary cage rotating on the axis of the driven-shaft, and pinions mounted on the cage, a pair of sun-gears capable of free rotation on the axis of the driven-shaft and having a driving connection with the planetary pinions, hand-actuated means operable at will for holding one of the sun-gears against rotation to drive the driven-shaft through the planetary pinions at a reduced speed-ratio, hand-operated means operable at will to hold the other sun-gear to drive the driven-shaft in reverse, a speed-controlled governor, means controlled by the governor for locking the two sun-gears against relative rotation and thereby drive the driven-shaft through the planetary cage and pinions at the same speed as the driving-member, and a lever connecting both of said hand-operated means for controlling the same simultaneously.

14. In a transmission mechanism, the combination of a driving-member, a driven-shaft, a planetary reduction-gearing including a planetary cage rotating on the axis of the driven-shaft and pinions mounted on the cage, a sun gear capable of free rotation on the axis of the driven-shaft and having a driving connection with the planetary pinions, said sun-gear having a drum-rim rigid therewith, a second sun-gear driven from the planetary pinions and having a band for engaging the drum-rim and a speed control device connected with the last-named sun-gear for controlling the band to apply the same to the drum-rim and thereby lock the two sun-gears against relative rotation and operating thereafter to drive the driven shaft at the same speed as the driving-member.

15. In a transmission mechanism, the combination of a driving-member, a driven-shaft, reduction-gearing between the driving-member and the driven-shaft for driving the driven-shaft at a reduced speed ratio, said reduction gearing including planetary gearing with a sun-gear having a drum-rim, and including another gear wheel having means driven thereby to engage the drum-rim and cooperate therewith to form a friction clutch, and a speed-control device driven through the reduction-gearing and operating to close the friction clutch and lock the said gear wheels against relative movement and thereby drive the driven-shaft at a higher speed.

16. In a transmission mechanism, the combination of a driving-member, a driven-shaft having a rigid gear wheel for driving the same, a planetary reduction gearing including a planetary cage rotating on the axis of the driven-shaft and planetary pinions mounted on the cage for engaging the said gear wheel to rotate the driven-shaft, a sun-gear having a driving connection with the planetary driving pinions and capable of rotating freely on the axis of the driven shaft, means operable at will for holding the sun-gear fixed to effect the driving of the driven-shaft at a reduced speed from the driving member, a speed-controlled device, and means controlled by the same for holding parts of the planetary reduction gearing against relative rotation to drive the driven-shaft at the same speed as the driving-member.

17. In a transmission mechanism, the combination of a driving-member, a driven-shaft having a rigid gear wheel for driving the same, a planetary cage connected with the driving-member and rotating on the axis of the driven-shaft, a set of pinions carried by the cage meshing with the said gear wheel to drive the driven-shaft, a sun-gear capable of rotation on the axis of the driven-shaft and meshing with said pinions to drive the same, a second sun-gear capable of rotating freely on the axis of the driven-shaft, a second set of pinions carried on the cage meshing with the last-named sun-gear and with the first-named sun-gear for driving the latter, means operable at will for holding the second-named sun-gear against rotation to drive the driven-shaft at reduced speed from the driving-member and speed-controlled means driven through the transmission for locking the two sun-gears against relative rotation and thereby effecting the driving of the driven-shaft at the same speed as the driving-member.

Signed at Los Angeles, Calif., this 2d day of August, 1928.

JAMES A. JOHNSON.